United States Patent [19]

Seiler

[11] Patent Number: 5,003,190

[45] Date of Patent: Mar. 26, 1991

[54] ACCELERATION PICKUP, ESPECIALLY FOR RELEASE OF OCCUPANT PROTECTING DEVICES IN THE EVENT OF ACCIDENT

[75] Inventor: Hartmut Seiler, Reutlingen, Fed. Rep. of Germany

[73] Assignee: Robert Bosch GmbH, Stuttgart, Fed. Rep. of Germany

[21] Appl. No.: 216,944

[22] Filed: Jul. 8, 1988

[30] Foreign Application Priority Data

Aug. 6, 1987 [DE] Fed. Rep. of Germany ....... 3726145

[51] Int. Cl.⁵ ...................... B60R 21/08; G01P 15/04
[52] U.S. Cl. .................................... 307/9.1; 307/10.1; 200/61.48; 200/61.5; 280/735; 280/274; 180/279
[58] Field of Search ..................... 307/9, 10 R, 105 B, 307/10 LS, 117; 200/52 R, 52 A, 61.45 R, 61.45 M, 61.47, 61.50, 61.52, 61.51, DIG. 9, DIG. 18, DIG. 29, DIG. 35, 61.48, 61.53; 335/224, 46, 56, 76, 90, 93, 110, 121, 164, 165, 171, 185, 186, 188, 255; 340/52 R, 52 H, 61, 62, 65, 66, 71, 72; 180/274, 268, 282, 286, 271, 287, 272; 324/207, 208, 244, 245, 246, 260, 262, 263

[56] References Cited

U.S. PATENT DOCUMENTS

| | | | |
|---|---|---|---|
| 1,138,808 | 5/1915 | Tatum | 335/255 X |
| 3,066,202 | 11/1962 | Kaleba et al. | 200/61.5 |
| 3,434,106 | 3/1969 | Lawless | 340/61 X |
| 3,509,530 | 4/1970 | Parkes | 340/71 |
| 3,559,164 | 1/1971 | Bancroft et al. | 340/72 |
| 3,601,564 | 8/1971 | Ellison | 200/61.48 |
| 3,814,875 | 6/1974 | Takada | 200/61.48 |
| 4,243,971 | 1/1981 | Suchowerskyj et al. | 340/524 |
| 4,287,765 | 9/1981 | Kreft | 340/524 X |
| 4,308,438 | 12/1981 | Rossel et al. | 340/524 X |
| 4,346,913 | 8/1982 | Schauf et al. | 340/524 X |
| 4,410,875 | 10/1983 | Spies et al. | 340/524 |
| 4,497,025 | 1/1985 | Hannoyer | 340/524 X |
| 4,608,501 | 8/1986 | Andres et al. | 307/105 B |
| 4,641,041 | 2/1987 | Mattes et al. | 307/105 B X |
| 4,728,917 | 3/1988 | Kimpel | 335/78 X |

FOREIGN PATENT DOCUMENTS 8401991 5/1984 Fed. Rep. of Germany .
1640950 8/1987 Fed. Rep. of Germany .

Primary Examiner—Paul Ip
Attorney, Agent, or Firm—Michael J. Striker

[57] ABSTRACT

An acceleration pickup, especially for release of occupant protecting devices in power vehicles in the event of an accident comprises a housing, a spring element, a seismic mass cooperating with the spring element, a movable contact, and a magnetic system formed so that the spring element is deflectable by the magnetic system in a rest position of the acceleration pickup independently of an outer acceleration and the contact is closeable.

11 Claims, 4 Drawing Sheets

ACCELERATION PICKUP, ESPECIALLY FOR RELEASE OF OCCUPANT PROTECTING DEVICES IN THE EVENT OF ACCIDENT

BACKGROUND OF THE INVENTION

The present invention relates to an acceleration pickup especially for release of occupant protecting devices in power vehicles in the event of an accident.

Acceleration pickups of the above mentioned general type are known in the art. One of such acceleration pickups has a seismic mass which is arranged on a spring element and is in operative connection with a release contact. This acceleration pickup cannot be tested in a built-in condition. The operation of the acceleration pickup provided for emergencies cannot be controlled automatically and at any time.

It is further known to make a seismis mass of ferromagnetic material and hold it by a magnetic system in a rest position. A deviation of the seismic mass is determined with the aid of a light barrier. Here a testing program is possible with uninterrupted current; however, an outside inertia force must act on the mass.

SUMMARY OF THE INVENTION

Accordingly, it is an object of the present invention to provide an acceleration pickup of the above mentioned general type which can be tested without action of an outer inertia force in a built-in condition.

In keeping with these objects and with others which will become apparent hereinafter, one feature of the present invention resides, briefly stated in an acceleration pickup in which a spring element is deflectable by a magnetic system in a rest position of the acceleration pickup independently of an outer acceleration, and a contact is closeable in this condition.

When the acceleration pickup is designed in accordance with the present invention, it can be tested without action of an outside inertia force in a built-in condition. The operability of the pickup can be controlled any time by an automatic testing cycle so that the reliability is considerably improved. The acceleration pickup can be produced by an insignificant reconstruction of known series products which are used for other purposes. The determination of the spring force and the magnitude of the seismic mass can be easily used for adjustment of the acceleration threshold. When the magnetic system is excited additionally below its own pulling excitement, the response sensitivity of the acceleration pickup can be reduced. For example, depending on traveling condition of the vehicle, either acceleration or braking, high or low speed, distance to a forwardly running vehicle, etc., the response sensitivity can be changed. This can be achieved without mechanical changes of the pickup only by electronic switching means. With the aid of the magnetic system, additionally a vibration suppression of the acceleration pickup is possible in a simple manner. When the contacts of the acceleration pickup are closed by a sufficiently high and sufficiently long acceleration, the contacts by a subsequent excitement of the magnetic system (being released by the first closing of the contact) can be maintained closed so long as desired for the reliable operation of the release system.

When the seismic mass is not rigidly connected with the contact tongue but instead is freely suspended and only abuts against the contact tongue, only inertia forces which lead to closing of the contact are transmitted. The inertia forces which originate from the seismic mass itself and would activate opening of the contact, cannot be transmitted to the contact tongue.

By a special construction of the support of the seismic mass on the spring element as well the force transmission to the contact tongue, it is possible to produce an acceleration pickup which is responsive either in all directions or in a deferred direction. With the aid of the magnetic system, the whole function can be tested without action of an outer inertia force. With the aid of a second magnetic system, a weighing of the release devices can be achieved. The spring forces are so dimensioned that the acceleration pickup does not close during a pure position change. It is especially advantageous that in this embodiment of the acceleration pickup which is sensitive all around, the seismic mass and the contact are each provided with their own magnetic system. By the separation of the operations of vibration suppression as well as system monitoring and electronic threshold value adjustment, the respective objects can be achieved in a relatively accurate manner. For the system including the contacts and the spring, it is cost-economical to use the above mentioned series structural elements.

For preventing unintentional release of the acceleration pickup, it is advantageous to determine the spring of the magnetic system relative to one another, so that a closing of the contact can be achieved by the excitement of the magnetic system, when the magnetic system is connected with voltage as takes place in normal condition of the vehicle. When the magnetic system is supplied with voltages which are considerably higher than the normal operational voltage of the power vehicle, the required pulling force is reached closing the contacts. These voltages can be obtained for example by a voltage multiplying circuit. For maintaining the contact closed, also the normal vehicle operational voltage can be sufficient.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
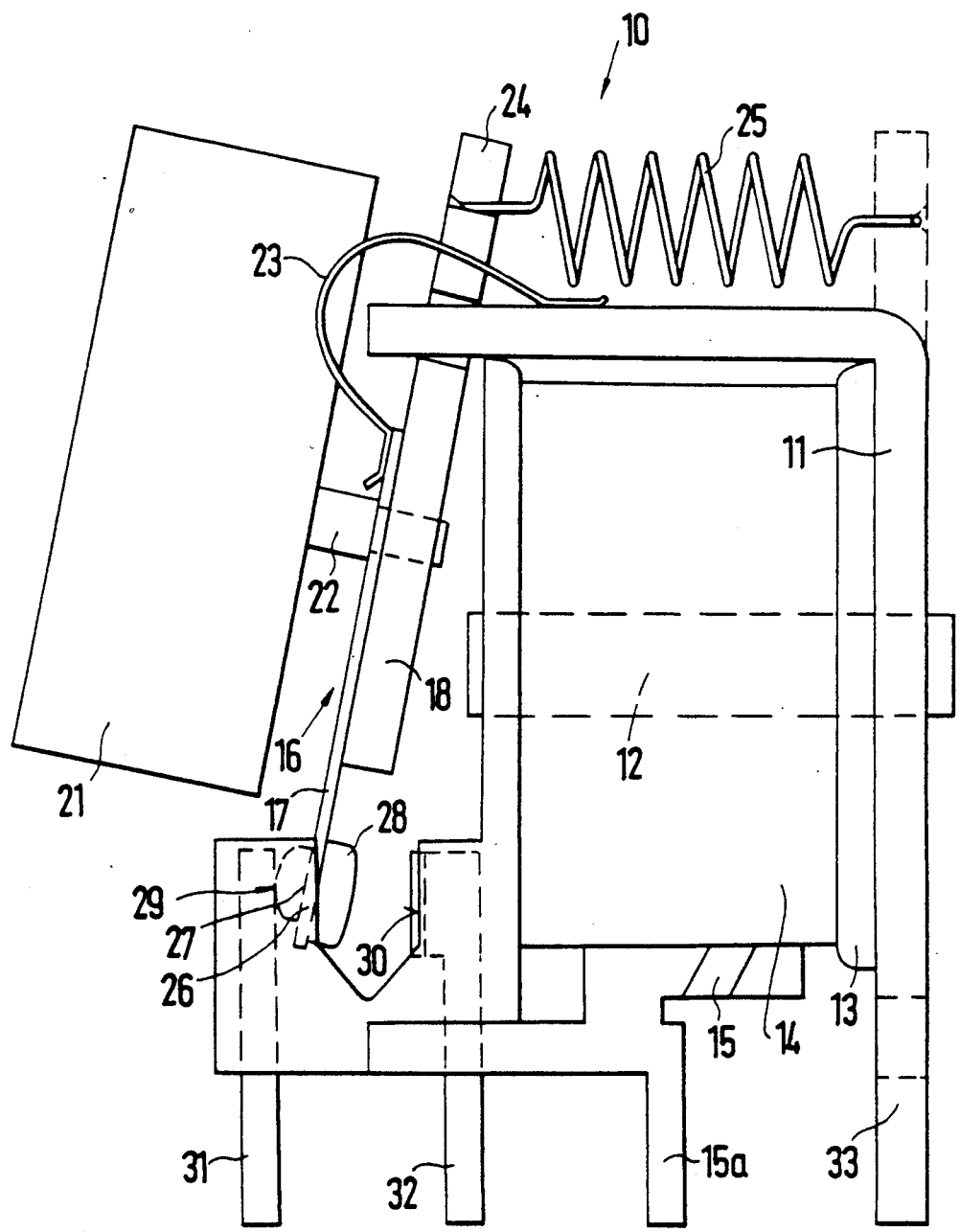
FIG. 1 is a view showing a section of an acceleration pickup in accordance with the present invention.

An acceleration pickup in accordance with the present invention is identified as a whole with reference numeral 10. It has a ferromagnetic housing which serves as a yoke 11 of a magnetic system. A coil 14 which is wound on a coil support 13 composed of a non-conductive material, is located on a ferromagnetic core 12. Connecting pins 15 and 15a of the coil 14 are arranged in the coil support 13.

A multi-part spring element 16 is supported on the yoke 11. The spring element 16 includes a flat spring 17, for example a bronze spring, and a hinge armature 18. A seismic mass 21 is arranged on the spring element 16 for example with the aid of a rivet 22. For providing a good current flow, the spring element 16 is additionally connected with the yoke 11 through a copper band 23. A return spring 25 is arranged at one end 24 of the hinge armature 18, while its another end is mounted on an extension of the yoke 11. For providing the desired acceleration threshold of the acceleration pickup 10, the force of the return spring 25 and the size and position of the seismic mass 21 relative to one another are determined.

The hinge armature 18 is composed of a ferromagnetic material and is in operative connection with the iron core 12 and the coil 14. Two contacts 27 and 28 are arranged on the other end 26 of the spring element 17. The contact 27 cooperates with a spacing contact 29, while the contact 28 cooperates with a closing contact 30. Both the spacing contact 29 and the closing contact 30 as well as their respective connecting pins 31 and 32 are arranged in the coil support 13. An electrical connecting pin 33 of the movable contacts 29 and 28 is located on the end of the yoke 11. The electrical connections 31, 32, 33 lead to a not shown evaluating circuit for a safety device, for example a safety belt, an air bag or an overroll bracket of a power vehicle.

In a basic position of the acceleration pickup 10 or in other words when no acceleration acts on the seismic mass 21, an electric current circuit is closed from the connecting pin 32 through the yoke 11, the bronze spring 23, the contact 27, the contact 29, and the connection 31.

When an outer inertia force acts on the seismic mass 21 of the acceleration pickup 10, again after exceeding the predetermined acceleration threshold the spring element 16 is moved against the force of the return spring 25 with the contact 28 onto the closing contact 30. The contacts 28 and 30 are closed. As a result, the safety device which is connected with the contacts 32 and 33 is thereby released.

The acceleration pickup 10 can be tested before or after its mounting in a power vehicle without action of an outer inertia force. For this purpose, a sufficiently high current is supplied through the coil 14. The field lines of the magnetic field produced as a result of this extend through the yoke 11, the hinge armature 18 and the iron core 13. If the force of the magnetic field exceeds the force of the return spring 25, the hinge armature 18 is pulled to the iron core 12 until the contact 28 and 30 are closed. The operability of the acceleration pickup 10 can thereby be continuously tested. After switching off of the current of the coil 14, the spring element 16 is moved back by the force of the return spring 25 to its initial position.

When a current flows through the coil 14 and produces a magnetic force which is smaller than the force of the hinge armature 18 applied by the return spring 25, the acceleration threshold is reduced. Thereby the hinge armature 18 can move in the case of a lower acceleration, and the contact 28 and the closing contact 30 are closed. In this case only the difference between the magnetic force and the force of the spring 25 must be overcome by the inertia force produced during the acceleration. Thereby the mechanically fixedly provided accelerating threshold can be reduced in electrical way and made dependent from outer conditions, for example, respective traveling condition of the vehicle. Depending on whether the vehicle is directly accelerated, braked or moved with uniform speed, the acceleration threshold can be individually changed.

Figure 2:
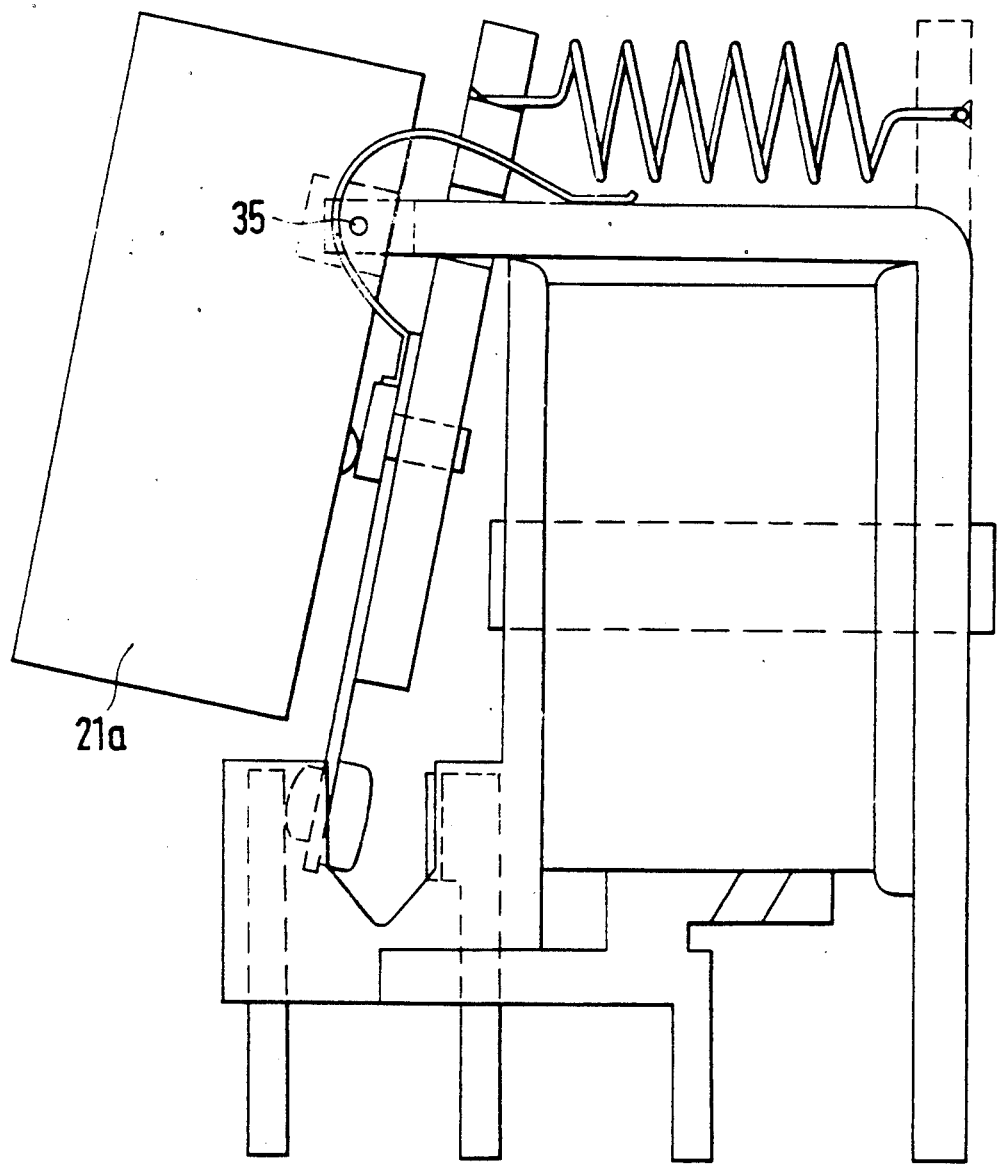
FIG. 2 is a view showing another embodiment of the acceleration pickup in accordance with the present invention.

In deviation from the embodiment of FIG. 1, the embodiment in FIG. 2 is an acceleration pickup in which a seismic mass 21a is movably mounted on the yoke 11 with the aid of a pivot bearing 35. The mass 21a abuts against the spring element 16 loosely. When an outer inertia force acting against the force of the return spring 25 acts upon the seismic mass 21a, the contact 28 and the closing contact 30 are closed as in the above described embodiment. An inertia force which acts opposite or in other words in direction of the return spring 25, can no longer open the contact 28. The seismic mass 21 can freely swing back and has no direct cooperation with the spring element 16. This embodiment is especially advantageous for a reliable and especially vibration-free contact making.

An especially effective vibration suppression is achieved when after the first closing of the contacts 28 and 60 the coil 14 is excited for a predetermined short time and the contacts 28 and 30 are held closed. Under vibration a multiple reciprocating swings of the spring element 16 are understood, until the contact 28 and the closing contact 30 are firmly closed. A further improvement of the vibration suppression is obtained with the aid of two additional contacts which are not shown in the drawings and which are closed shortly before the contacts 28 and 30 and switch on the current for the coil 14.

Figure 3:
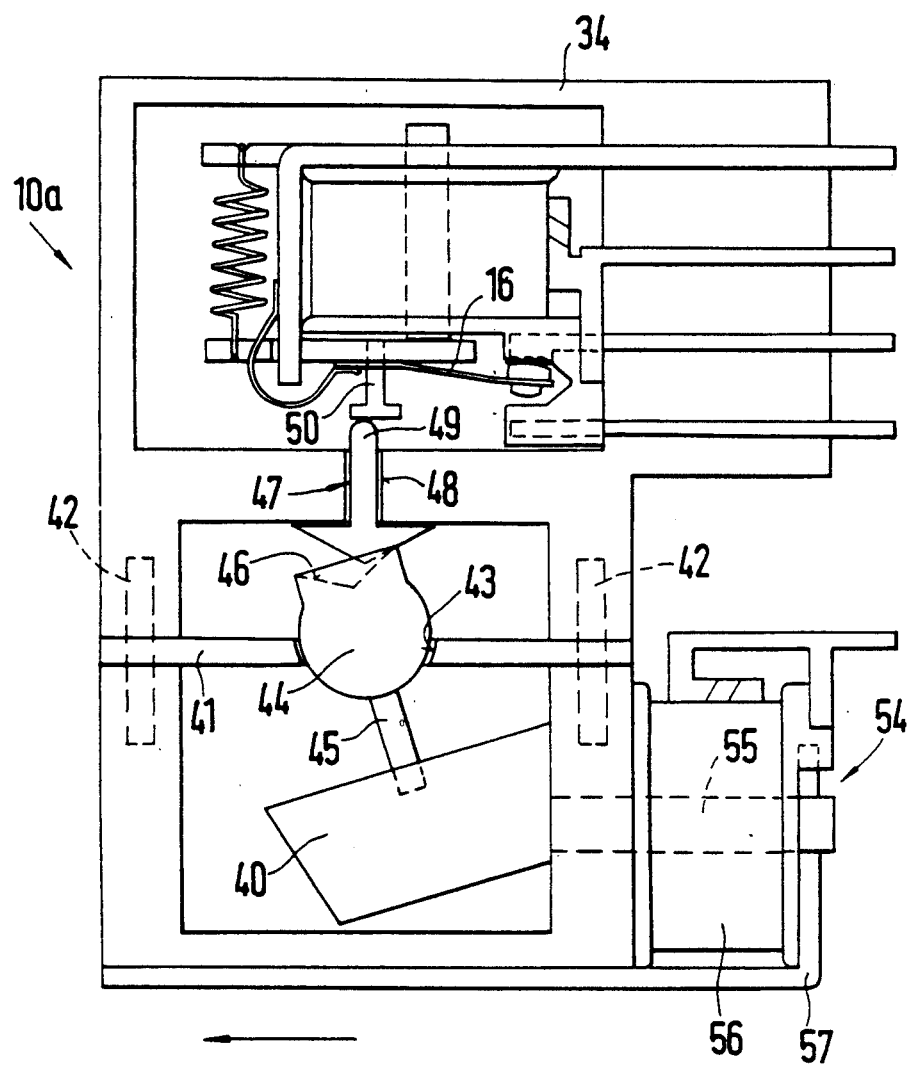
FIG. 3 is a section through a further embodiment of the inventive acceleration pickup.

The embodiment of FIG. 3 shows a special construction of a seismic mass 40 for an acceleration pickup 10a which is sensitive in all directions. The acceleration pickup 10a has a housing 34 and a bearing ball 44 which is arranged in the housing 41 and carries the seismic mass 40. The seismic mass 40 is connected with the bearing ball 44 by a pin 45. The seismic mass 40 is formed as a truncated cone, so that the inner space of the housing 34 can be used in an optimal manner. Diametrically opposite to the seismic mass 40, the bearing ball 44 is provided with a conically shaped open recess 46 at the side which faces the spring element 15. A conically shaped transmission part 47 engages in the recess 46. It is recommended that the recess is formed conically or the recess can be formed in the transmission part 47. The transmission part 47 has a plunger 49 which is guided in an opening 48 of the housing 34. A pressing part 50 arranged on the spring element 16 is associated with the plunger 49.

A second magnetic system 54 is flanged in the region of the seismic mass 40 in the housing 34. It includes a coil 56 which is wound on an iron core 55 and surrounded by an iron yoke 57 which is mounted on the housing 34.

With the aid of the second magnetic system 54 the releasing function of the acceleration pickup 10a can be tested without an outer inertia force. The first magnetic system controls, as in the preceding embodiments, the operation of the spring element 16 and the contact 28 or the closing contact 30. The second magnetic system 54 monitors without outer inertia force additionally the operation of the seismic mass 40. For this purpose, a current flows through the coil 56, so that the force of the produced magnetic field deviates the seismic mass 40 which is composed of a ferromagnetic material. Further, with the aid of the second magnetic system 54, also weighing of a releasing direction of the acceleration sensor 11a can be activated. For this purpose, current continuously flows through the coil 56 so that the seismic mass is deviated a little in a predetermined direction. Thereby the deviation in one direction can be more difficult while the deviation in the other direction can be facilitated.

Figure 4:
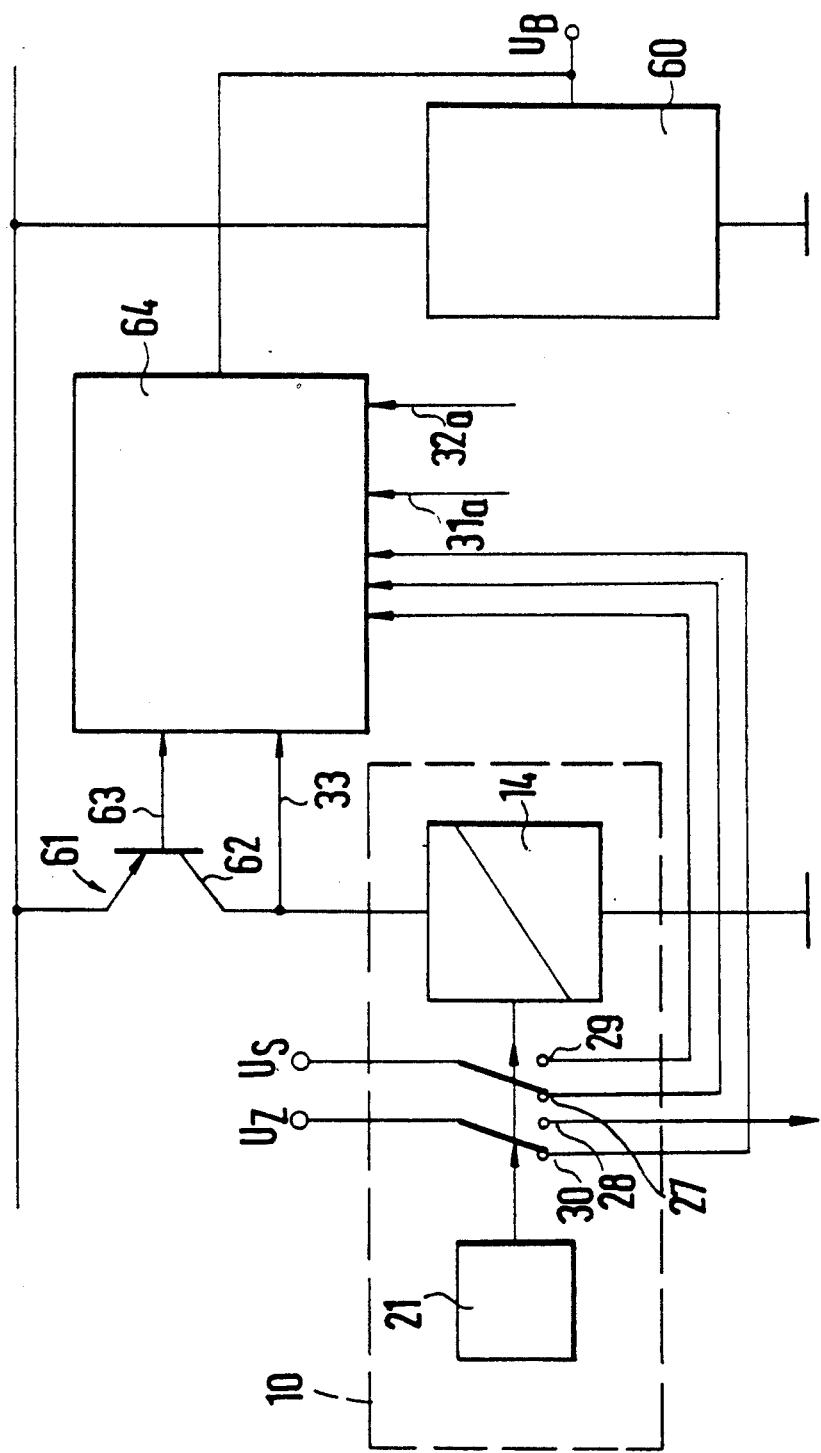
FIG. 4 is a view showing a block diagram of the acceleration pickup of the present invention.

FIG. 4 schematically shows a block diagram for controlling the acceleration pickup 10. The vehicle-battery voltage $U_B$ is supplied to a voltage multiplier 60 and through a transistor switch 61 the multiplied voltage is supplied via a connection 62 to the coil 14 of the magnetic system. The transistor switch 61 is connected with its control electrode 63 to an operational unit 64. The operational unit 64 contains an electronic circuit for producing a testing cycle, for vibration supression and/or for electronic change of the response threshold of the acceleration pick 10.

The operational unit 64 is controlled by the contacts 27 and 29 or 28 and 30 and a control input 31a for controlling the testing cycle and through a control input 32a for transmitting the traveling condition. The connection 33 serves for monitoring the magnetic system and for applying a changeable current for adjusting the response threshold of the acceleration pickup. The current for changing the response threshold is advantageously taken from the normal battery voltage $U_{Bat}$. Thereby it is guaranteed that in the event of a system defect the magnetic system cannot be excited so that the contacts are closed. The connection 27 is connected with the voltage supply for the sensor contact $U_S$ and the connection 30 is connected with the voltage supply for the ignition system U, whereby the connection 28 leads to the ignition circuit.

It will be understood that each of the elements described above, or two or more together, may also find a useful application in other types of constructions differing from the types described above.

While the invention has been illustrated and described as embodied in an acceleration pickup, especially for releasing of occupant protecting devices in the event of an accident, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An acceleration pickup, especially for release of occupant protecting devices in a vehicle in the event of an accident, comprising a housing; a seismic mass; a spring element operative for spring-biasing said seismic mass; a movable contact; a magnetic system deflecting said spring element in a rest position of said seismic mass independently of an outer acceleration and thereby closing said contact; and an electrical operation unit in connection with a voltage multiplier such that a pulling force of said magnetic system is reached when said magnetic system connected with a voltage which exceeds an operational voltage of the vehicle.

2. An acceleration pickup as defined in claim 1, wherein said magnetic system includes a coil which is wound on a core composed of a ferromagnetic material, and a ferromagnetic body arranged on said spring element.

3. An acceleration pickup as defined in claim 1, wherein said seismic mass is movably connected with said housing and abuts freely on said spring element.

4. An acceleration pickup as defined in claim 1, wherein said seismic mass is rigidly connected with said spring element.

5. An acceleration pickup as defined in claim 1; and further comprising a counter contact connectable with a release element for occupant protecting devices, said contact being provided on said spring element and being movable in and out of contact with said counter contact.

6. An acceleration pickup as defined in claim 1, wherein said contact has a closing direction and said magnetic system has a pulling direction which are substantially parallel to one another.

7. An acceleration pickup as defined in claim 1; and further comprising a bearing ball which is supported on said mass and has a side which is opposite to said mass and provided with a first conical formation; and a pressing plate acting on said spring element and provided with a second conical formation engaging with and disengaging from said first conical formation, one of said conical formations being a conical recess, while the other of said conical formations is a conical portion engaging said conical recess, said seismic mass being composed of a ferromagnetic material; and a second magnetic system acting on said seismic mass of ferromagnetic material.

8. An acceleration pickup as defined in claim 1; and further comprising a counter contact connectable with a release element for occupant protecting devices and being in operative connection with said contact, said operational unit having an electronic circuit for vibration suppression, so that after closing at least one of said contacts under the action of an inertia force on said seismic mass a current which is greater than a current for holding said magnetic system flows for a sufficiently long time through said coil and a time of flowing of said current is determined by said circuit for vibration suppression.

9. An acceleration pickup as defined in claim 1, wherein said electrical operational unit includes a circuit for a testing cycle for testing an operability of the acceleration pickup.

10. An acceleration pickup as defined in claim 1, wherein said electrical operational unit includes a circuit for changing a response threshold of the acceleration pickup.

11. An acceleration pickup as defined in claim 1, wherein said electrical operational unit includes a circuit for vibration suppression.

* * * * *